July 13, 1965     H. KURKJIAN     3,194,058
WEIGHT AND BALANCE DETERMINATION
Filed Sept. 18, 1962     2 Sheets-Sheet 1
*Fig.1.*
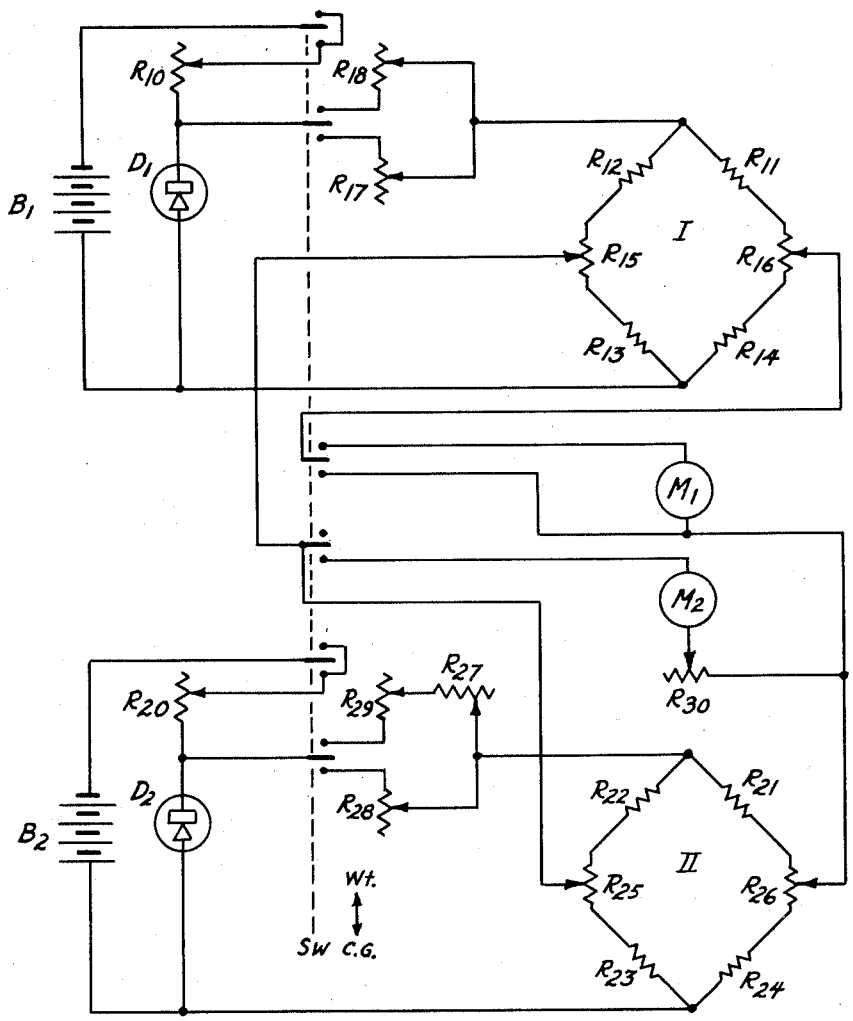
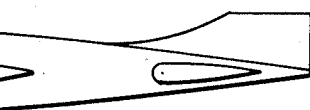
*Fig.5.*
INVENTOR.
HAIG KURKJIAN
BY Charles A. McClure
ATTORNEY.

July 13, 1965   H. KURKJIAN   3,194,058
WEIGHT AND BALANCE DETERMINATION
Filed Sept. 18, 1962   2 Sheets-Sheet 2
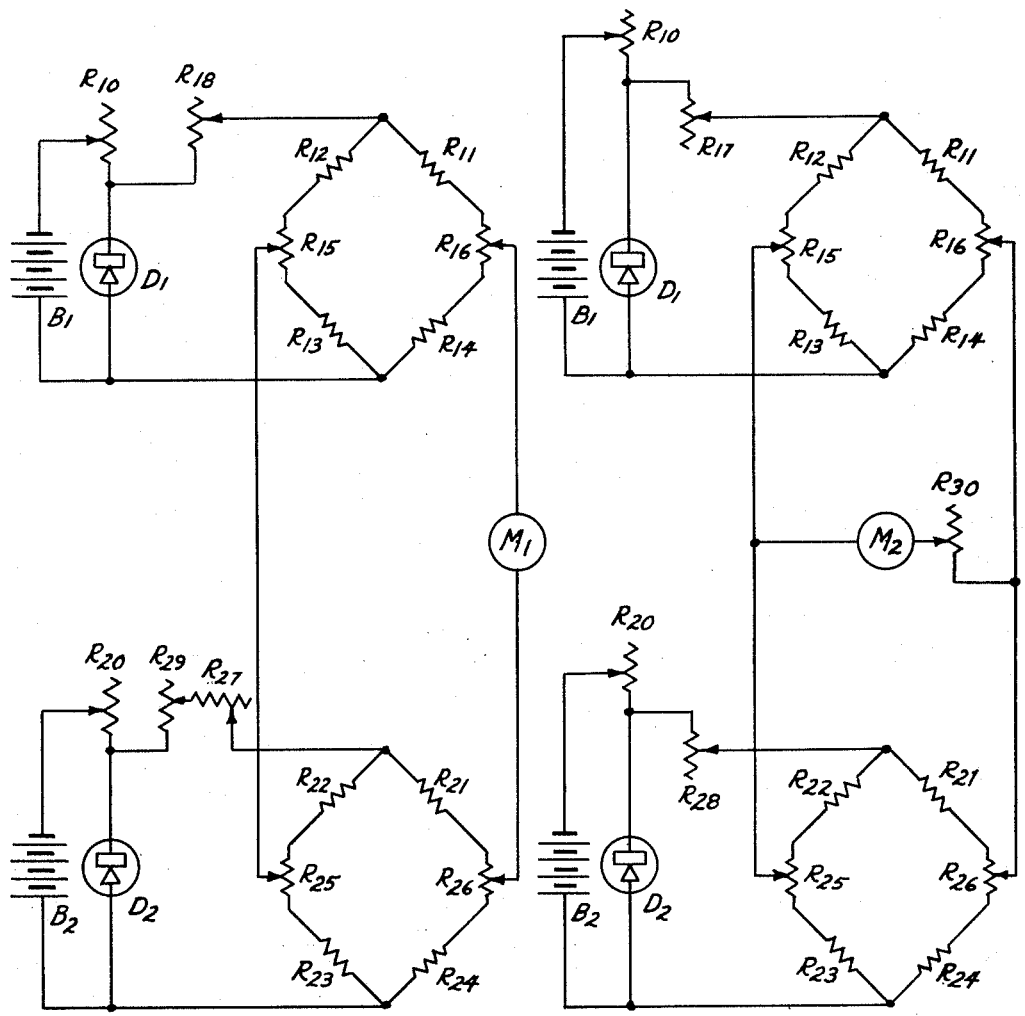
*Fig. 2.*   *Fig. 3.*
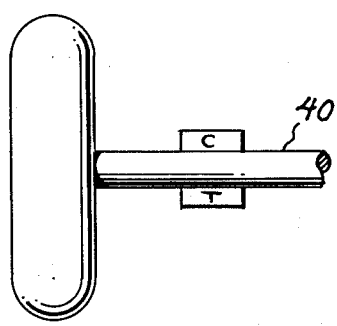
*Fig. 4.*
INVENTOR.
HAIG KURKJIAN
BY
Charles A. McClure
ATTORNEY.

United States Patent Office 3,194,058
Patented July 13, 1965

3,194,058
WEIGHT AND BALANCE DETERMINATION
Haig Kurkjian, R.D. 1, Malvern, Pa.
Filed Sept. 18, 1962, Ser. No. 224,401
7 Claims. (Cl. 73—65)

This invention relates to determination of weight and balance of aircraft or other vehicles, concerning especially electrical apparatus for making such determination.

While the unloaded weight and the center of gravity (CG) of a vehicle usually are known or readily determinable, loading of the vehicle will augment the weight to a degree that may not be readily apparent and may shift the CG, thereby affecting the stability of the vehicle. In aircraft particularly it is desirable to know both total weight and CG location accurately enough to minimize structural stress and permit optimum setting of controls, so as to maximize safety of operation and minimize fuel consumption.

Systems employed to provide determination of weight and CG should be accurate, reliable, lightweight, and relatively inexpensive. No known system meets these requirements satisfactorily, whether because of excessive complexity or other reason.

A primary object of the present invention is improved determination of total weight and center of gravity of a vehicle.

An object is advantageous utilization of semiconductor strain gages as certain bridge components in a system for determining weight and center of gravity.

Another object is provision of an improved electrical weight-and-balance indicator.

An object is an electrical weight-and-balance system of great sensitivity without electronic amplification.

A further object is a temperature-compensated electrical weight-and-balance system.

Other objects of this invention, together with means and methods for attaining the various objects, will be apparent from the following description and the accompanying diagrams.

FIG. 1 is a schematic diagram of an electrical system according to the present invention;

FIG. 2 is a schematic diagram of the portion of the circuit of FIG. 1 employed in determination of weight;

FIG. 3 is a schematic diagram of the portion of the circuit of FIG. 1 employed in determination of center of gravity;

FIG. 4 is an elevation, largely schematic, of a structural supporting element with strain gages mounted thereon;

FIG. 5 is a diagrammatic representation of an airplane in side elevation with indication of certain distances thereon.

In general, the objects of the present invention are accomplished by means of a pair of measuring circuits responsive to the respective portions of load applied to a pair of supporting structures, each circuit including a plurality of stress-responsive impedance elements stressed by contact with corresponding supporting structure, means for summing the outputs of the respective circuits at equal inputs the sum thereof providing an indication of the total load, and means for comparing the outputs of the respective circuits at inputs proportional to the distances of the respective supporting structures from the location of the center of gravity at no load, the comparison thereof providing an indication of the location of the center of gravity under the applied load. The invention contemplates, in each of the measuring circuits, a bridge, each of whose arms is responsive to the load on one of the supporting structures; combination of the respective bridge outputs in the same sense or direction results in an indication of total weight, while combination of the respective bridge outputs in the opposite sense or opposing directions results in an indication of center-of-gravity of CG location, as specified more fully below.

FIG. 1 shows schematically an electrical circuit exemplifying this invention. Bridge I and its related elements appear in the upper half of the diagram, while bridge II and its related elements appear in the lower half. The first bridge contains variable resistors R11, R12, R13, and R14 in its four arms, from upper right to lower right, and the second bridge similarly contains variable resistors R21, R22, R23, and R24 in its corresponding arms. The second and third arms of the first bridge are joined by adjustable resistor R15, and its first and fourth arms are joined by adjustable resistor R16, while the corresponding pairs of arms of the second bridge are joined by adjustable resistors R25 and R26, respectively. Taps from these pairs of resistors (i.e., R15, R16 in the one instance, and R25, R26 in the other) comprise the bridge output leads, as will be apparent from the application of electrical potential to the other pair of arm junctions of each bridge.

Switch S1, represented by broken lines, has an upper or weight (Wt) position and a lower or center-of-gravity (CG) position for each of a half dozen switch arms, indicated by short horizontal solid lines intercepted by the broken lines and terminating at a solid dot (indicating a pivot for the switch arm). It will be apparent that in its upper position the switch connects the two bridge outputs in series with a meter, and that in its lower position the switch connects the two bridge outputs in parallel with another meter. FIG. 2 shows the elements of FIG. 1 as connected with the switch in the weight-determining or Wt position, and FIG. 3 shows the elements of FIG. 1 as connected in the CG position for determining center of gravity. In both hookups the potential supplied by battery B1 is applied to regulating diode D1, which conveniently is of the Zener type, through adjustable resistor R10, while the potential from battery B2 is supplied similarly to diode D2 through adjustable resistor R20.

In FIG. 2, which shows the weight-determining circuit, the tap from adjustable resistor R10 leads to the top of bridge I (i.e., the junction of its first and second arms) through adjustable resistor R18, and the tap from resistor R20 leads to the top of bridge II through adjustable resistors R29 and R27 in series; the bottom (i.e., the junction of its third and fourth arms) of each bridge is connected directly to its source of potential. The respective bridge outputs are connected by joining the tap from resistor R15 to the tap from resistor R25, and connecting the leads from the taps of respective resistors R16 and R26 to meter M2, thereby placing the meter in series with the bridge outputs. In this position meter M1 is connected between the output leads from R16 and R26 of the respective bridges, while the output leads from R15 and R25 are joined, thus connecting the two bridge outputs in series with the meter. With equal input potentials and bridge sensitivity, such a hookup sums the applied weight of load as indicated hereinafter.

In FIG. 3, which shows the circuit for determining center of gravity, the tap from adjustable resistor R10 of the source of potential for the first bridge reaches the top of the bridge through adjustable resistor R17, which replaces resistor R18 of the W circuit; the tap from R20 of the source of potential for the second bridge reaches the top of the bridge through adjustable resistor R28, which replaces resistors R27, R29 of the W circuit. The respective bridge outputs are connected by joining the tap from resistor R15 to the tap from resistor R25, and joining the tap from resistor R16 to the tap from resistor R26. Leads to meter M2 are connected to the respective junctions of the pairs of taps, thereby placing the meter in parallel with the bridge outputs. Adjustable resistor R30 is present in one of the meter leads.

Each of the bridge resistors R11, R12, R13, R14, R21, R22, R23, and R24 is variable in response to physical stress applied to or across it, being preferably in the form of a semiconductor strain gage. FIG. 4 shows in a rather schematic elevational view the location of a pair of such gages upon stress-bearing element 40 in the form of a horizontal axle shaft or housing, which is subject to bending stress. Gage C is affixed to the upper surface, which is in compression, and gage T is affixed to the lower surface, which is in tension. It will be apparent that an increase in load would increase the stresses (compressive and tensile, respectively) applied to the gages, while a decrease in load would decrease such stresses. According to this invention, each bridge is associated with a supporting axle or similar supporting structure for the aircraft or other vehicle whose weight and balance are to be computed. Thus, the strain gages or variable resistors of bridge I may be located on the main landing gear of an aircraft, and those of bridge II on the auxiliary landing gear (i.e., nose or tail wheel or skid) of the same aircraft.

It may be assumed that the resistance of each strain gage normally increases upon application of tension and decreases upon application of compression, also that in each bridge the opposing arms contain similar elements responsive to like stresses (i.e., both subjected to compression or both to tension). For example, the odd-numbered resistors in the bridge arms (not at the junctions) may represent strain gages subjected to compression, and the even-numbered elements those subjected to tension. Then, if a bridge is balanced under given stress conditions, an increase in load will unbalance it by decreasing the resistance in the first and third arms and increasing the resistance in the second and fourth arms. The resulting unbalance will manifest itself as a difference in potential between the junction of the first and fourth arms (i.e., the right hand tap) and the junction of the second and third arms (i.e., the left hand tap).

When the applied potentials and bridge sensitivities are properly proportioned to the stress-responsiveness of the bridge resistors the output of each bridge may be calibrated as weight corresponding to the loading stress, and the outputs of the two bridges can be summed to determine the total load. In the ideal case the potentials applied to both bridges will be identical, as will the bridge sensitivities and the variability of the bridge resistors with stress. Resistors R10 and R20 adjust the potential applied across respective diodes D1 and D2, and one or more additional resistors are present in the input leads to the respective bridges. These additional resistors function as indicated below to assure accuracy of the measurements.

Determination of the total weight by means of this system is readily understood. At proper adjustment, as suggested above, equal bridge outputs or degrees of unbalance represent equal applied weights. Of course, in general the load will not be borne equally by the supporting structures; the main landing gear of an aircraft ordinarily bears the major portion of applied load, and the auxiliary gear only a minor portion. However, these respective portions are additive, and in the present invention the bridge outputs in the Wt position of the switch are summed by series connection to meter M1, which is calibrated conveniently to read total weight.

FIG. 5 shows in elevaiton, largely schematically, an airplane, with the longitudinal (i.e., fore and aft) separation of certain locations noted. The location of the center of gravity is denoted by a cross in a circle. The respective longitudinal separations between a perpendicular from the extreme forward portion or nose of the aircraft, which is merely an arbitrary reference point, to the auxiliary gear, main gear, and a perpendicular from the center of gravity, are represented by reference characters A, B, and C, respectively. Reference characters N and M represent the longitudinal separations of the respective landing gear or supporting structures from the center of gravity. Thus, $N$ equals $C$ minus $A$; while $M$ equals $B$ minus $C$. Distances M and N may be referred to as "arms"; the weight supported on the auxiliary gear times arm N is the moment of that force about the center of gravity, and it should equal the force moment found by multiplying the weight supported on the main gear times arm M. Any change in the location of the center of gravity will show up as an inequality of such moments, and the actual center of gravity can be computed by computing new values for arms M and N (and, thus, distance C) to equalize the moments.

Determination of CG location by means of this system will be readily understood in the light of the above explanation. In order to render net bridge output indicative of a moment of force, the input potentials to the respective bridges are made proportional to the respective arms; i.e., the input to bridge I, which is associated with the main landing gear, is adjusted to $M/N$ times the input to bridge II, which is associated with the auxiliary landing gear. This change-over from equal input potentials is accomplished by proper adjustment of resistors R17 and R28, which are in the respective bridge input circuits when the switch is in the CG position. The reading of meter M2 which is connected in parallel with the bridge outputs indicates the deviation, if any, from the location of the original or unloaded center of gravity and is calibrated conveniently to read in units of distance from that location. Resistor R30 is manually adjustable in accordance with the total weight reading on meter M1 so as to proivde the proper sensitivity of meter M2, which provides the desired comparison of moments about the nominal or unloaded center of gravity.

Inasmuch as all four arms of each bridge are active, their resistances being responsive to stresses imposed on gear allocated with that bridge, any change in temperature of the supporting structure to which the strain gages are bonded will be reflected as a change in resistance of each arm of the bridge. The resulting degree of error will in general be less than in bridges wherever fewer than all the arms are located so as to respond similarly to such temperature change. However, in the interest of increased accuracy of measurement, it may be desirable to compensate for such errors attributable to temperature changes. Thermistors may be used for this purpose; for example, a high-resistance thermistor may be placed in parallel with each gage, and a low resistance thermistor in series with each bridge input. Strain gages may be obtained in pairs having positive and negative gage factors, respectively, to facilitate temperature compensation.

According to this invention R11, R12, R13, R14, R21, R22, R23 and R24 are preferably strain gages of the semiconductor type having gage factors of 200 or more and resistances on the order of several hundred ohms. Such gages are available from Micro Systems, Incorporated, San Gabriel, California, and Kulite-Bytrex Corporation, Newton, Massachusetts, as well as other manufacturers, who also can furnish information concerning pairing of gages and other methods of temperature compensation.

The other circuit elements shown above also are readily available in the trade. The resistors conveniently are wirewound potentiometers having the following representative values:

|  | Ohms |
|---|---|
| R15, R16, R25, R26 | 100 |
| R10, R17, R20, R28 | 500 |
| R18, R29 | 1000 |
| R30 | 5000 |
| R27 | 10000 |

Batteries B1 and B2 may suitably provide potentials of 4 (or 8) volts and be made of mercury cells or if desired may be of silver-cadmium or silver-zinc type. Diodes D1 and D2 are preferably of Zener type useful in that voltage range. Meters M1 and M2 are conventional ammeters calibrated from 0 to 50 microamperes. Switch SW and the remaining circuitry components are so conventional as to require no comment.

The above specific description of a preferred embodiment of the present invention is exemplary, rather than limitative. Advantages of this invention have been mentioned, and other benefits doubtless will become apparent and accrue to those who undertake to practice it as defined in the following claims.

The claimed invention is:

1. In an electrical weight-and-balance indicator for a vehicle supported on a pair of supporting structures, a first bridge circuit each of whose arms is responsive to the load on a first supporting structure, and a second bridge circuit each of whose arms is responsive to the load on a second supporting structure; means for applying across each bridge a potential proportional to the distances of the respective supporting structures from a given intermediate location in line with them, whereupon each of the bridge outputs represents the moment of the portion of the load upon the associated supporting structure at its distance from the given location, and means for subtracting the two outputs to indicate the distance and direction of the center of gravity, under load, from the given location.

2. In an electrical weight-and-balance indicator for vehicles, a pair of bridge circuits responsive to the respective portions of load applied to a pair of supporting structurs, each of the bridge circuits producing an output that varies in accordance with variation in the portion of the load applied to the supporting structure by which stress is applied to the arms of that bridge, each arm of each bridge including an element stressed by contact with the corresponding supporting structure, means for applying across each bridge a potential proportional to the distances of the respective supporting structures from the location of the center of gravity at no load and means for detecting differences in opposing outputs of the respective bridges thereby obtaining an indication of the location of the center of gravity under the applied load.

3. In an electrical weight-and-balance indicator for vehicles, a pair of bridge circuits responsive to the respective portions of load applied to a pair of supporting structures, each of the bridge circuits producing an output that varies in accordance with variation in the portion of the load applied to the supporting structure by which stress is applied to the arms of that bridge, each arm of each bridge including an element stressed by contact with the corresponding supporting structure, means for detecting variations in the same sense in the outputs of the respective bridges at equal inputs and thereby obtaining an indication of the total load, and means for detecting variations in the opposite sense in the outputs of the respective bridges at inputs proportional to the distances of the respective supporting structures from the location of the center of gravity at no load and thereby obtaining an indication of the location of the center of gravity under the applied load.

4. In an electrical weight-and-balance indicator for a vehicle supported on a pair of supporting structures, a first bridge circuit each of whose arms is responsive to the load on a first supporting structure, and a second bridge circuit each of whose arms is responsive to the load on a second supporting structure; means for applying across each bridge a potential, whereupon the respective bridge outputs are indicative of the loads upon the respective supporting structures, a means for summing the respective bridge outputs to indicate the total load on the supporting structures; means for applying across each bridge a potential proportional to the distances of the respective supporting structures from a given intermediate location in line with them, whereupon each of the bridge outputs represents the moment of the portion of the load upon the associated supporting structure at its distance from the given location, and means for subtracting the two outputs to indicate the distance and direction of the center of gravity, under load, from the given location.

5. The apparatus of claim 4 wherein the given location is at the intersection of a perpendicular from the center of gravity of the vehicle at no load to a shortest line joining the supporting structures.

6. In an electrical weight-and-balance indicator for aircraft having a plurality of supporting structures upon which the aircraft is adapted to be supported, a first bridge circuit comprising a first pair of opposing arms, each including a stress-responsive element whose impedance is a function of compression in a first supporting structure, and containing a second pair of opposing arms each including a stress-responsive element whose impedance is a function of tension in the first supporting structure; a second bridge circuit comprising a first pair of opposing arms, each including a stress-responsive element whose impedance is a function of compression in a second supporting structure, and containing a second pair of arms, each including a stress-responsive element whose impedance is a function of tension in the second supporting structure; electrically actuated indicating means; a first source of potential adapted to be connected across the first bridge as the input thereto, a second source of potential adapted to be connected across the second bridge as the input thereto, means for connecting the respective sources of potential to the bridges, means for equalizing the sensitivity of the two bridges, and means for connecting the outputs of the respective bridges in series with the indicating means, as an indication of the total weight of load on the respective supporting structures; and means for proportioning the respective input potentials to the bridges in accordance with the relative spacing of the respective supporting structures from an unloaded center of gravity, and means for connecting the outputs of the respective bridges in parallel with the indicating means, as an indication of the departure of the center of gravity when so loaded from the location of the unloaded center of gravity.

7. In an electrical weight-and-balance indicator for aircraft having a plurality of supporting structures upon which the aircraft is adapted to be supported, a first bridge circuit comprising a first pair of opposing arms, each including a stress-responsive element whose impedance is a function of compression in a first supporting structure, and containing a second pair of opposing arms each including a stress-responsive element whose impedance is a function of tension in the first supporting structure; a second bridge circuit comprising a first pair of opposing arms, each including a stress-responsive element whose impedance is a function of compression in a second supporting structure, and containing a second pair of arms, each including a stress-responsive element whose impedance is a function of tension in the second supporting structure; a first source of potential adapted to be connected across the first bridge as the input thereto, a second source of potential adapted to be connected across the second bridge as the input thereto, means for connecting the respective sources of potential to the bridges, means for equalizing the sensitivity of the two bridges, a first meter, and means for connecting the outputs of the respective bridges in series with the meter, as an indication of the total weight of load on the respective supporting structures; means for proportioning the respective input potentials to the bridges in accordance with the relative spacing of the respective supporting structures from an unloaded center of gravity, a second meter, and means for connecting the outputs of the respective bridges in parallel with the meter, as an indication of the departure of the center of gravity when so loaded from the location of the unloaded center of gravity.

References Cited by the Examiner
UNITED STATES PATENTS

| | | | |
|---|---|---|---|
| 2,443,045 | 6/48 | Magruder et al. | 73—65 |
| 2,443,098 | 6/48 | Dean | 73—65 |
| 2,453,607 | 11/48 | Wardle et al. | 73—65 |
| 2,686,426 | 8/54 | Kolish | 73—65 |

RICHARD C. QUEISSER, *Primary Examiner.*